H. P. CLAUSEN.
ELECTRICAL TESTING SYSTEM.
APPLICATION FILED DEC. 29, 1916.

1,237,477.

Patented Aug. 21, 1917.
3 SHEETS—SHEET 1.

Inventor:
Henry P. Clausen.

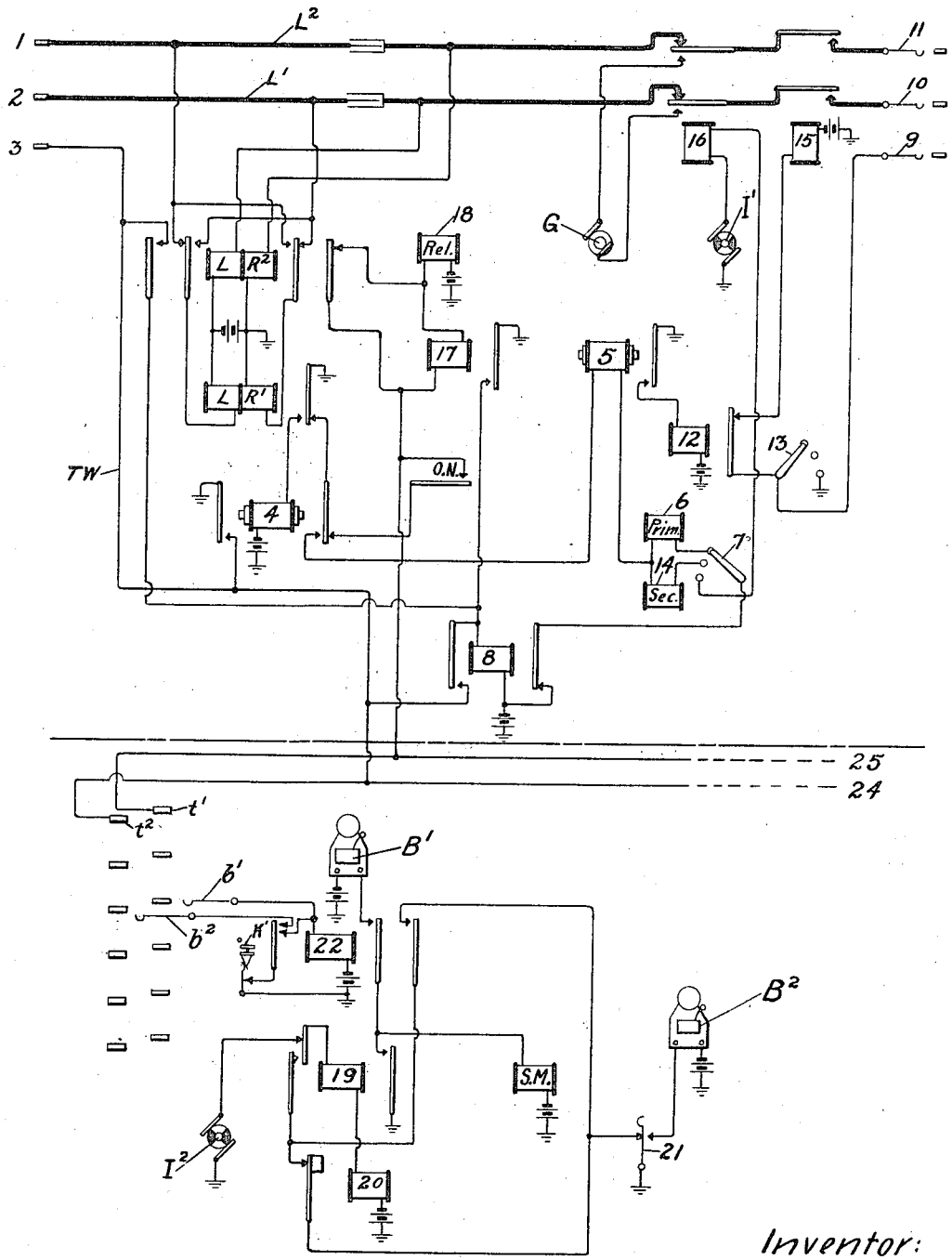

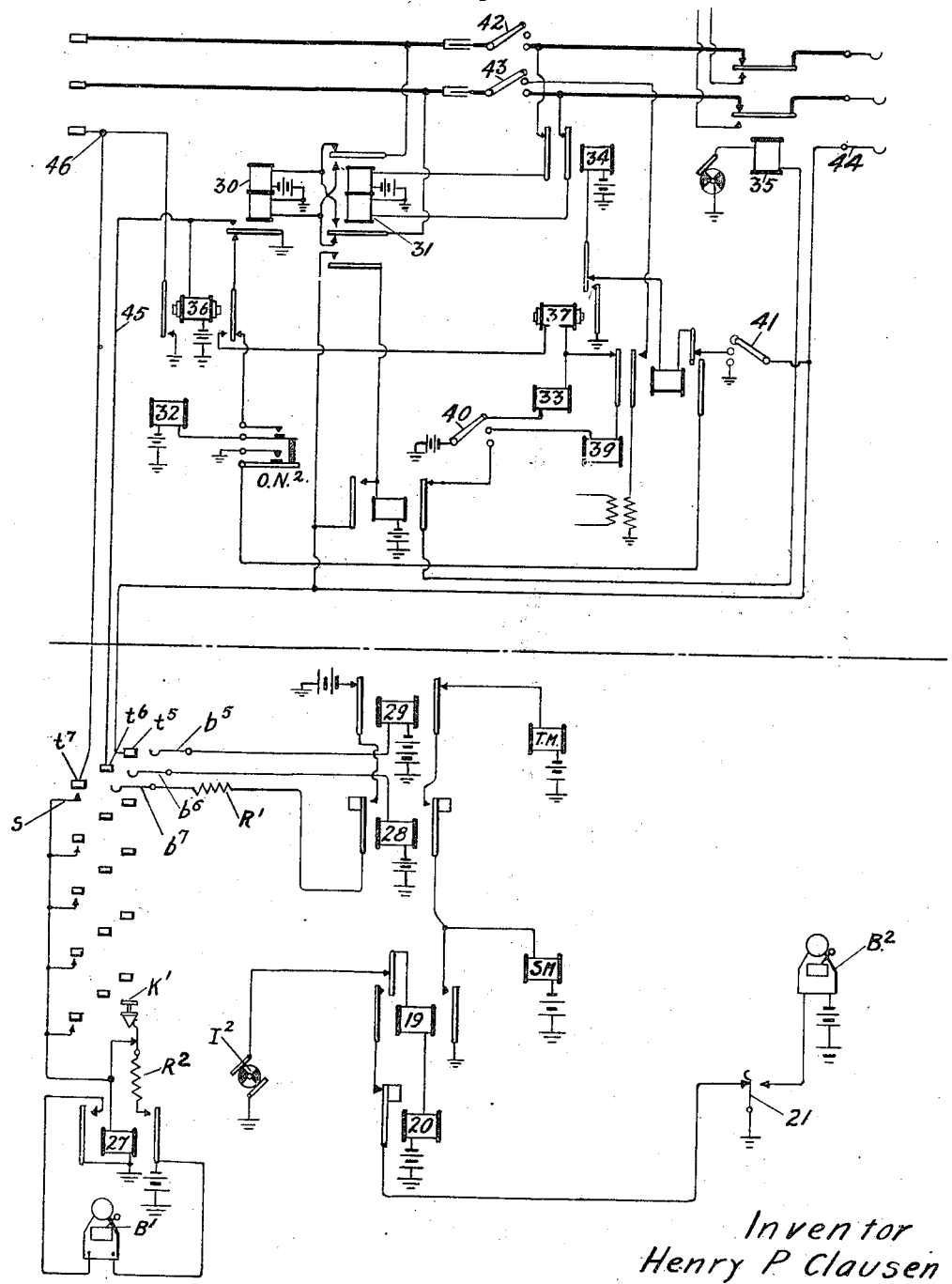

ized by the placing of a path of low re-
UNITED STATES PATENT OFFICE.

HENRY P. CLAUSEN, OF MOUNT VERNON, NEW YORK, ASSIGNOR TO WESTERN ELECTRIC COMPANY, INCORPORATED, OF NEW YORK, N. Y., A CORPORATION OF NEW YORK.

ELECTRICAL TESTING SYSTEM.

1,237,477.  Specification of Letters Patent.  Patented Aug. 21, 1917.

Application filed December 29, 1916. Serial No. 139,562.

*To all whom it may concern:*

Be it known that I, HENRY P. CLAUSEN, a citizen of the United States, residing at Mount Vernon, in the county of Westchester and State of New York, have invented certain new and useful Improvements in Electrical Testing Systems, of which the following is a full, clear, concise, and exact description.

This invention relates to electrical testing systems and particularly to that class of systems which is used in telephone exchanges for performing routine tests on telephone apparatus.

The object of the invention is to provide means for successively and automatically testing certain pieces of apparatus for unstandard conditions and for operating a signal and identifying such pieces of apparatus as are found in an unstandard condition and at the same time for holding them out of service until such unstandard condition is remedied.

A feature of the invention is the provision of means for causing an automatic routine testing device to pause in its operation when an unstandard condition is detected and to operate a signal which will summon an attendant. Through the virtue of pausing and thus remaining in association with the pieces of apparatus in which an unstandard condition is detected, two results are accomplished, the first of which is to indicate positively which piece of apparatus is at fault, and the second of which is to prevent such piece of apparatus from further attempts at giving service.

Another feature of the invention, which is a modification of that just described, is means for tripping a target associated with the apparatus within which an unstandard condition has arisen and then causing the automatic routine testing device to continue in the performance of its duties. The tripping of the target in this case accomplishes the same results as before, that is, it indicates positively which piece of apparatus is in an unstandard condition and it holds such piece of apparatus out of service until the detected unstandard condition is remedied.

Figure 1:
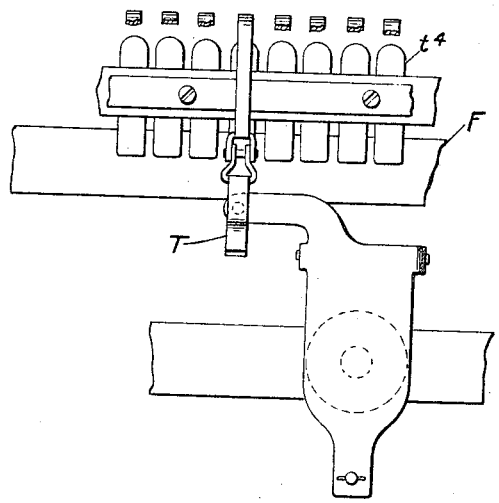
Figure 2:
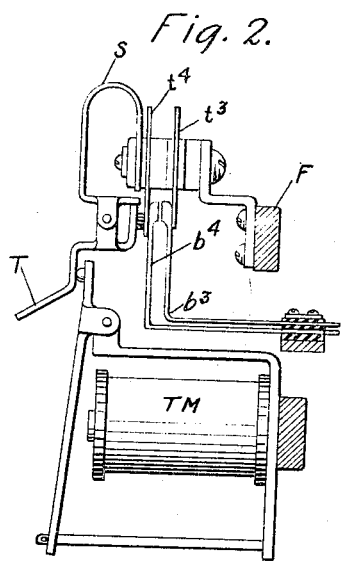
Figure 3:
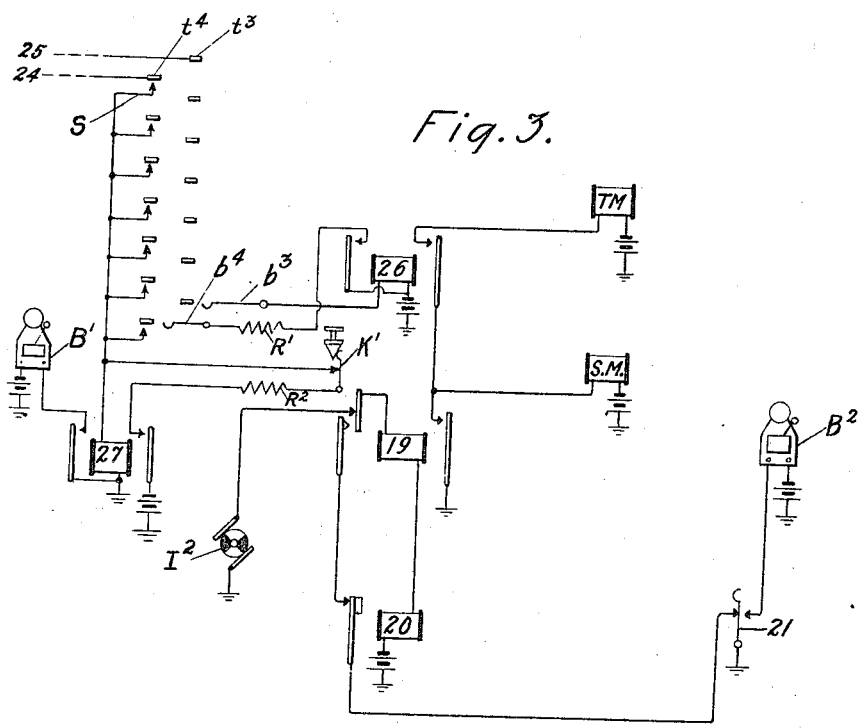

In the drawings, Figure 1 is a side view of a portion of the automatic routine testing device showing the targets individual to the pieces of apparatus to be tested; Fig. 2 is an end view of the same; Fig. 3 is a diagrammatic representation of the circuits and apparatus employed in connection with the structures shown in Fig. 1 and Fig. 2; Fig. 4 is a diagrammatic representation of the testing device embodying the feature whereby the device is caused to pause in its operation until the detected unstandard condition is remedied, the part above the broken line being a diagrammatic representation of an automatic connector switch of a kind well-known in the art; and Fig. 5 is a diagrammatic representation of another connector switch and a modification of the testing device whereby a test for an unstandard condition is made in a slightly different manner.

Referring now especially to Fig. 4, it is thought that a clear understanding of the nature of an unstandard condition which may be tested for, will be had from the following detailed description.

The terminals 1, 2 and 3 represent the terminals of the connector switch as they appear in a preceding selector switch and upon which the brushes of such selector switch may rest. It will be assumed that a call has been initiated by a calling party and has been extended as far as the terminals 1, 2 and 3 in a well-known manner. The seizure of this connector switch is signalized by the placing of a path of low resistance over the calling line between the terminals 1 and 2. A circuit is thereupon established from ground, right-hand winding of relay LR', the inner right-hand armature of relay LR², conductor and normal contact of relay LR², conductor L', the terminal 2 through the path of low resistance comprising the subscriber's substation telephone apparatus, the terminal 1, the conductor L², normal contact and inner left-hand armature of relay LR², left-hand winding of relay LR', to battery and thence to ground. Relay LR' thereupon attracts its armature and establishes a circuit from ground, armature and alternate contact of relay LR', winding of slow-release relay 4 to battery and thence to ground. In turn, relay 4 attracts its armatures and establishes a circuit which extends from ground, left-hand armature and contact of relay 4 to the test wire TW, terminal 3 and thence through well-known circuits including a relay in the line switch (not shown) to battery and ground.

The subscriber now manipulates his impulse transmitter, thereby intermittently opening and closing the path of low resistance extending between terminals 1 and 2 and causing the rapid vibration of the armature of relay LR'. The first retraction of its armature by the relay LR' establishes a circuit from ground, armature and normal contact of relay LR', right-hand armature and alternate contact of relay 4, winding of slow-release relay 5, winding of primary magnet 6, first position contact and side-switch arm 7, right-hand armature and contact of relay 8, to battery and ground. Relays 5 and 6 are energized in this circuit. Relay 5 being slow to release does not subsequently release until after the full series of impulses has been transmitted. Relay 6, however, responds to each separate impulse and thereby causes the group selecting operation of the brushes 9, 10 and 11 in accordance with the setting of the subscriber's impulse transmitter.

The energization of relay 5 results in the establishment of a circuit from ground, armature and contact of relay 5, winding of relay 12 to battery and ground. Relay 12 attracts its armature while energized, and upon deënergization, in response to the deënergization of relay 5, it causes the movement of side-switch arms 7 and 13 into the second position.

The last manipulation of the impulse transmitter by the calling subscriber causes the transmission of impulses through a circuit which now extends from ground, armature and normal contact of relay LR', right-hand armature and alternate contact of relay 4, winding of relay 5, winding of secondary magnet 14, second position contact and side-switch arm 7, and thence over the circuit previously traced. The secondary magnet 14, responding to the separate impulses, drives the brushes 9, 10 and 11 into association with the terminals of the desired party's line. At the end of this series of impulses, line relay LR' permanently attracts its armature, thereby opening the circuit just described. Relay 5 again deënergizes, and relay 12, responding to the action of relay 5, drives the side-switch arms 7 and 13 into their third position.

In this position, a circuit is established from ground, the third position contact and side-switch arm 13, armature and contact of relay 12, winding of relay 15 to battery and ground. Relay 15 attracts its armatures and extends the talking conductors of the connector switch L' and L² to the brushes 10 and 11 and from thence over the conductors of the called subscriber's line to this telephone apparatus (not shown). At the same time, a circuit is established from ground, interrupter I', winding of relay 16, third position contact and side-switch arm 7, right-hand armature and contact of relay 8 to battery and ground. Under the influence of interrupter I', relay 16 intermittently attracts and retracts its armatures. During the interval in which these armatures are attracted, ringing current is transmitted over a circuit extending from the generator G, alternate contact and inner armature of relay 16, inner armature and contact of relay 15, brush 10, conductors and apparatus of the called subscriber's substation, brush 11, contact and outer armature of relay 15, outer armature and alternate contact of relay 16 and thence to generator G. Through this circuit, the telephone bell at the called subscriber's substation is rung.

When in response to the summons of his bell, the called subscriber removes the receiver from its hook, if at that instant the armatures of relay 16 are retracted, a circuit will be established from ground, right-hand winding of relay LR², upper talking conductor L², normal contact and outer armature of relay 16, outer armature and contact of relay 15, brush 11, through the brushes and apparatus of the subscriber's substation, brush 10, contact and inner armature of relay 15, inner armature and normal contact of relay 16, lower conductor L', left-hand winding of relay LR², to battery and thence to ground. Relay LR² attracts its armatures and establishes a circuit from ground, left-hand armature and contact of relay 4, test wire TW, contact and outer left-hand armature of relay LR², winding of relay 8 to battery and thence to ground. Relay 8, in attracting its armatures, opens at its right-hand armature the energizing circuit for relay 16, thereby preventing the further flow of ringing current over the called subscriber's line. Relay 8 also establishes a locking circuit for itself extending from ground, left-hand armature and contact of relay 4, test wire TW, contact and left-hand armature of relay 8, winding of relay 8 to battery and thence to ground. In this manner, then, the calling subscriber is put in telephonic communication with the called subscriber.

Let us now assume that an unstandard condition exists in the connector switch, which may be described as a dirty or unreliable contact at the outermost right-hand armature of relay LR². When, at the conclusion of the conversation between the calling and the called party, both have replaced their receivers on their hooks, the paths of low resistance, extending in one case between the terminals 1 and 2, and in the other case between the brushes 10 and 11, will be removed, whereupon both relays LR' and LR² will retract their armatures. Relay LR' in retracting its armature allows the deënergization of relay 4, and establishes a circuit from ground, armature and normal contact of relay LR', right-hand armature and normal contact of relay 4, off-normal switch ON, winding of relay 17, winding of release magnet 18, to battery and ground. The windings or relays 17 and 18, however, are so proportioned that the current flowing through them in series is sufficient to cause the energization of the relay 17 only. It thereupon attracts its armature and establishes a circuit from ground, armature and contact of relay 17, winding of relay 8, to battery and ground, thus maintaining the energization of the latter relay and at the same time preserving the ground on the test wire TW through the left-hand armature and contact of relay 8. The right-hand armature and contact of relay $LR^2$ is intended to short-circuit relay 17 and cause the energization of relay 18, but due to the unstandard condition this energization does not occur, and the brushes 9, 10 and 11 are left in association with the called subscriber's telephone line. The ground on the conductor extending between the off-normal switch ON and the winding of relay 17 constitutes a changed electrical condition at this point, indicating such an unstandard condition.

The routine testing apparatus diagrammatically shown below the broken line is connected to the various connector switches of the type shown above the broken line, through terminals $t'$ and $t^2$. The brushes $b'$ and $b^2$ are arranged to travel over and make contact with terminals $t'$ and $t^2$.

Let it be assumed in the first case that no unstandard condition, signalized as before described by a ground on a terminal $t'$, is encountered. A stepping magnet SM is provided which, upon deënergization, steps the brushes $b'$ and $b^2$ from association with one set of terminals to the association with the next set of terminals. This stepping magnet is operated in the following manner.

Let it be assumed that the interrupter $I^2$ has just reached a point where a circuit is established from ground, interrupter $I^2$, normal contact and left-hand armature of relay 19, winding of relay 19, winding of slow-acting relay 20, to battery and ground. Relay 19 attracts its armatures and establishes a circuit from ground, right-hand armature and contact of relay 19, winding of stepping magnet SM to battery and thence to ground. Relay 19 also establishes a circuit from grounded battery, winding of relay 20, winding of relay 19, alternate contact and left-hand armature of relay 19, contact and armature of slow-acting relay 20, to the normal contact of switch 21 and thence to ground. Relay 20 is so designed and adjusted that it will not open its contact under its present energization until sufficient time has elapsed to allow the interrupter $I^2$ to reach a position where no circuit is completed therethrough. When at last relay 20 does attract its armature, it opens the energizing circuit for the two relays 19 and 20, which thereupon become deënergized. Through the agency of the stepping magnet SM the brushes $b'$ and $b^2$ are advanced into association with the next connector switch to be tested.

Let it be assumed that these brushes now rest on the terminals $t'$ and $t^2$ of a connector switch in which the described unstandard condition exists. When, under the influence of the stepping magnet SM, the brushes $b'$ and $b^2$ are advanced into association with the terminals $t'$ and $t^2$, the ground existing on the conductor extending between the off-normal switch and the relay 17 and which extends to the terminal $t'$, now extends through the brush $b'$, winding of relay 22, to battery and ground. Relay 22 attracts its armatures. When under the influence of interrupter $I^2$ relays 19 and 20 are energized, a circuit is established between ground, right-hand armature and contact of relay 19, inner right-hand armature and contact of relay 22 to the signal bell B' to battery and ground. Bell B' is energized in this circuit and is intended to summon an attendant who will remedy the unstandard condition. Relay 22 through its outer right-hand armature completes a circuit from ground, switch 21 and its normal contact, contact and outer right-hand armature of relay 22, left-hand armature and alternate contact of relay 19, winding of relay 19, winding of relay 20 to battery and thence to ground. Relays 19 and 20 are thereby held permanently energized and thus the advance of the brushes $b'$ and $b^2$ is prevented until the unstandard condition detected is finally remedied.

Through its left-hand armature and contact, relay 22 extends a ground to the brush $b^2$, terminal $t^2$ and thence to the test wire TW of the connector switch which is intended to hold such switch permanently busy until such time as the unstandard condition is remedied. At the same time an alternate circuit is established through the left-hand armature and contact of relay 22 to prevent the release of relay 22 if, due to the vibrations of the frame to which relay $LR^2$ is attached, the unstandard condition should temporarily disappear. It is to be noted then that the detection of an unstandard condition by the present testing means results in the pause of such testing means on the terminals of the piece of apparatus in fault and by such means it may be recognized.

The key K' is provided so that the relay 22 may be unlocked by an attendant who responds to the summons of the bell B'.

The switch 21 is arranged to be actuated when the brushes $b'$ and $b^2$ have reached and tested the last set of terminals $t'$ and $t^2$, in the row of such terminals. The actuation of the switch at that time establishes a circuit from ground, alternate contact of switch 21, signal bell $B^2$ to battery and ground. The ringing of this signal bell notifies the attendant that the test performed by the present testing device has been completed and he may reset the brushes $b'$ and $b^2$ by hand on the first set of terminals, such as $t'$ and $t^2$, ready for a second series of tests.

In the embodiment of the invention shown in Figs. 1 and 2, a structural arrangement is disclosed for identifying a set of terminals through which an unstandard condition in an associated piece of apparatus may be detected. Part of a frame F is shown, to which is rigidly connected a set of terminals $t^3$ and $t^4$. Brushes $b^3$ and $b^4$ are arranged to travel over and make contact with these terminals. Associated with the brushes is a magnet TM, which is arranged to make physical contact with target T, associated with that set of terminals $t^3$ and $t^4$ upon which the brushes $b^3$ and $b^4$ may rest. The operation of the tripping magnet TM actuates the target T, which is pivoted to a spring S in such a manner that when actuated, the spring S, due to its resiliency, will make electrical contact with the terminal $t^4$.

The operation of this device will now be described in connection with the circuits shown diagrammatically in Fig. 3. The conductors 24 and 25, connected to the terminals $t^3$ and $t^4$ lead from the same points in the circuit of the connector switch as the terminals $t'$ and $t^2$ in Fig. 4. The operation of the relays 19 and 20 is the same as in Fig. 4, but the operation of the device, as a whole, is somewhat different.

When the brush $b^3$ encounters the terminal $t^3$, which when grounded denotes the existence of an unstandard condition in the connector switch, the relay 26 responds through a circuit extending from ground, battery, winding of relay 26, brush $b^3$, terminal $t^3$, conductor 25, the off-normal contact ON, the normal contact and right-hand armature of relay 4, normal contact and armature of relay LR', to ground.

When, now, relay 19 operates, as before described, a circuit is established from ground, the armature and contact of relay 19, left-hand armature and contact of relay 26, winding of tripping magnet TM, to battery, and ground. Magnet TM attracts its armature and trips target T, which thereupon establishes a connection between spring S and the terminal $t^4$.

The relay 26 attracts its armatures and establishes a circuit from ground, battery, left-hand armature and contact of relay 26, resistance R', brush $b^4$, the terminal $t^4$, the winding of relay 27, and thence to ground. Relay 27 is energized in this circuit and attracts its armature, and thereupon a locking circuit is established from ground, winding of relay 27, the key $K^1$, resistance $R^2$, the contact and right-hand armature of relay 27, to battery, and ground. At its left-hand armature a circuit is established from ground, left-hand armature and contact of relay 27, the bell $B^1$, to battery, and ground. The energization of bell $B^1$ causes its actuation, and through the alarm thus sounded an attendant is summoned to remedy the detected unstandard condition.

The winding of relay 27 is of comparatively low resistance, and thus a ground is maintained on the test wire of the connector switch, which is intended to hold such connector switch out of service until the unstandard condition is remedied.

It should be noted that in this instance the testing device, as a whole, is not halted in its operation, but is allowed to continue stepping from one set of terminals to another in the manner previously described.

The key $K^1$ is provided for the purpose of unlocking the relay 27 when an attendant, in answer to the summons of the bell $B^1$, remedies the detected unstandard condition.

In the embodiment of the invention shown in Fig. 5, an arrangement is disclosed for testing for unstandard conditions in a connector switch of a slightly different type. That part of Fig. 5, which is above the broken line, is a diagrammatic representation of circuits and apparatus associated with a connector switch, and the part below the broken line represents diagrammatically the testing arrangement. The connector switch shown is of the well-known type in which the brush carrying spindle is first stepped vertically under the control of external impulses to bring the brushes opposite the level in which the desired line is to be found, and is then rotated also in response to external control impulses to bring the brush to the contacts of the desired line. The usual line relay is indicated at 30, the supervisory relay at 31, the release relay at 32, the primary magnet at 33, cut-off relay at 34, ringing relay at 35, the two slow-acting relays at 36 and 37, the secondary magnet at 39 and the vertical off-normal switch at $ON^2$. Side-switch arms are indicated at 40, 41, 42 and 43.

A common unstandard condition in a connector switch of this character occurs when such connector is seized or taken for use by a selector switch, and has failed to complete its normal operation in extending the connection to the terminals of the desired line. As soon as the connector has been taken for use, a ground is placed upon the conductor 45, due to the operation of the line relay 30. If, on the other hand, the operation of the connector has proceeded in the standard manner, there will also be a ground on brush 44 through the side-switch arm 41 in position 3. The manner in which the test arrangement distinguishes between these two conditions will best be understood from a description of the operation of making such test.

The corresponding terminals 44, 46, and conductors 45 of a plurality of connector switches, are connected to rows of terminals $t^5$, $t^7$ and $t^6$ of a testing device. The brushes $b^5$, $b^7$ and $b^6$ are arranged to travel over and make contact with these terminals.

The test performed in this instance is similar to that described in connection with Fig. 3. In this case, however, two relays are provided in place of one, such as 26. Should an idle condition be detected then neither the relay 28 or 29 will respond and the tripping magnet TM will not be actuated. Should a standard busy condition be detected both relays 28 and 29 will be actuated, but in this case, the tripping magnet TM will not be energized, since its circuit, which is closed first through the right-hand armature and contact of relay 28, has been opened at the right-hand armature and contact of relay 29; the relay 29 being a fast relay, and relay 28 being a slow acting relay.

Should an unstandard condition be detected, relay 28 alone will respond, and a circuit will be established from ground, right-hand armature, contact of relay 19, right-hand armature and contact of relay 28, right-hand armature and contact of relay 29, winding of tripping magnet TM, to battery, and ground. Target T will be tripped and the spring S will come in contact with the terminal $t^7$, whereby a ground is placed, as before, on the test terminal of the connector switch under test. In a manner similar to that previously described, relay 27 will be energized over a circuit extending from ground, battery, left-hand contact and armature of relay 29, left-hand contact and armature of relay 28, resistance R¹, brush $b^7$, spring S, winding of relay 27 to ground, and an alarm will be sounded by the bell B¹.

What is claimed is:

1. In an electrical testing system, means for detecting unstandard conditions in telephone apparatus comprising testing means responsive to a changed electrical condition denoting an unstandard condition, means controlled by said testing means for directly identifying a piece of apparatus in which an unstandard condition has been detected, and means for automatically and successively associating said testing means with said apparatus to be tested.

2. In an electrical testing system, means for detecting unstandard conditions in telephone apparatus comprising testing means responsive to a changed electrical condition denoting an unstandard condition, means controlled by said testing means for positively identifying a piece of apparatus in which an unstandard condition has been detected, means responsive to said identifying means for holding said piece of apparatus out of service until said unstandard condition is remedied, and means for automatically and successively associating said testing means with said pieces of apparatus to be tested.

3. In an electrical testing system, means for detecting unstandard conditions in telephone apparatus comprising testing means responsive to a changed electrical condition denoting an unstandard condition, means for holding a piece of apparatus in which an unstandard condition has been detected out of service, and means for automatically and successively associating said testing means with said pieces of apparatus.

4. In an electrical testing device, sets of terminals, brushes arranged to travel over and make contact with said terminals, means responsive to a changed electrical condition on one or more of said terminals denoting an unstandard condition, means for positively identifying a set of terminals on which an unstandard condition has been detected, and means for successively and automatically associating said responsive means through said brushes with each set of said terminals.

5. In an electrical testing device, sets of terminals, brushes arranged to travel over and make contact with said terminals, means responsive to a changed electrical condition on one or more of said terminals denoting an unstandard condition for positively identifying such terminals, link circuits extending between said means and said brushes, and means for successively and automatically associating said brushes with each set of said terminals.

6. In an electrical testing device, sets of terminals, brushes arranged to travel over and make contact with said terminals, like pieces of electrically connected apparatus joined to each set of said terminals, means for holding a piece of such apparatus out of service, said means being responsive to a changed electrical condition on one or more of said terminals denoting an unstandard condition, link circuits extending between said brushes and said responsive means, and means for successively and automatically associating said brushes with said terminals.

7. In an electrical testing device, sets of terminals, brushes arranged to travel over and make contact with said terminals, like pieces of electrically connected apparatus joined to each set of said terminals, means for positively identifying such a piece of apparatus, said means being responsive to a changed electrical condition denoting an unstandard condition, link conductors extending between said brushes and said responsive means, means for holding a piece of apparatus on which an unstandard condition has been detected out of service, and means for successively and automatically associating said brushes with said terminals.

8. In an electrical testing device, sets of fixed terminals, brushes arranged to travel over and make contact with said terminals, like pieces of electrically connected apparatus joined to said sets of terminals, a means individual to each set of terminals for holding the associated piece of electrically connected apparatus out of service, means responsive to a changed electrical condition on said sets of terminals denoting an unstandard condition in said apparatus for controlling said first mentioned means, link circuits extending between said brushes and said responsive means, and means for successively and automatically associating said brushes with said terminals.

9. In an electrical testing device, sets of fixed terminals, brushes arranged to travel over and make contact with said terminals, like pieces of electrically connected apparatus joined to said sets of terminals, means individual to each set of terminals for identifying said terminals when actuated, means responsive to a changed electrical condition on said terminals denoting an unstandard condition in said associated apparatus for controlling said identifying means, link circuits extending between said brushes and said responsive means, and means for successively and automatically associating said brushes with said sets of terminals.

10. In an electrical testing device, sets of fixed terminals, brushes arranged to travel over and make contact with said terminals, like pieces of electrically connected apparatus joined to said sets of terminals, means individual to each set of terminals for identifying said terminals when actuated, said identifying means when actuated also serving to hold the associated piece of apparatus out of service, means responsive to a changed electrical condition on said terminals denoting an unstandard condition in said associated apparatus for controlling said identifying means, link circuits extending between said brushes and said responsive means, and means for successively and automatically associating said brushes with said sets of terminals.

In witness whereof, I hereunto subscribe my name this 28th day of December, A. D., 1916.

HENRY P. CLAUSEN.

Copies of this patent may be obtained for five cents each, by addressing the "Commissioner of Patents, Washington, D. C."